United States Patent [19]

Kikuchi et al.

[11] Patent Number: 5,081,873

[45] Date of Patent: Jan. 21, 1992

[54] METHOD OF INSPECTING CONSTANT-VELOCITY JOINT

[75] Inventors: Tokio Kikuchi; Hiroshi Shiina; Keiji Takakura; Satoru Ichihashi, all of Saiyama, Japan

[73] Assignee: Honda Giken Kogyo Kabushiki Kaisha, Tokyo, Japan

[21] Appl. No.: 543,588

[22] Filed: Jun. 26, 1990

[30] Foreign Application Priority Data

Jun. 26, 1989 [JP] Japan .................................. 1-160904

[51] Int. Cl.⁵ .......................................... G01M 13/02
[52] U.S. Cl. ................................................. 73/865.9
[58] Field of Search ........................ 73/118.1, 9, 865.8, 73/865.9

[56] References Cited

U.S. PATENT DOCUMENTS

| | | | |
|---|---|---|---|
| 1,379,961 | 5/1921 | Chilton | 73/865.9 |
| 3,719,346 | 3/1973 | Bohannon et al. | 73/865.9 |
| 4,311,055 | 1/1982 | Vykukal et al. | 73/862.08 |

FOREIGN PATENT DOCUMENTS

| | | | |
|---|---|---|---|
| 1-259235 | 10/1989 | Japan . | |
| 2-57938 | 2/1990 | Japan . | |
| 0066420 | 3/1990 | Japan | 73/118.1 |
| 0657303 | 4/1979 | U.S.S.R. | 73/865.9 |

*Primary Examiner*—Robert Raevis

[57] ABSTRACT

An inner member of a constant-velocity joint is continuously tilted with respect to an outer member thereof up to a maximum tilt angle while the inner member is rotating. From data including tilt angles and torques which are measured when the inner member is tilted, and also from maximum and minimum torque values at the maximum tilt angle which are detected from the measured data, there is calculated a pair of curves indicative of the maximum and minimum torque values of the inner member at the respective tilt angles. Maximum and minimum torque values at a given tilt angle of the inner member are then calculated from the calculated curves, and then compared with the predetermined reference values, thereby determining whether the constant-velocity joint is good or not.

10 Claims, 4 Drawing Sheets

METHOD OF INSPECTING CONSTANT-VELOCITY JOINT

BACKGROUND OF THE INVENTION

The present invention relates to a method of inspecting or evaluating a constant-velocity joint for use in a power transmitting mechanism for automobiles or the like.

One known method of inspecting or evaluating a constant-velocity joint for use in an automobile drive shaft or the like is disclosed in Japanese Laid-Open Patent Publication No. 1(1989)-259235. According to the disclosed method, the inner and outer members of a constant-velocity joint are rotatably held, and then the inner member is tilted while it is rotating. Torques imposed to rotate the inner members at given tilt angles are measured and their maximum and minimum values are detected. Then, the detected maximum and minimum torque values are compared with reference values to determine whether the inspected constant-velocity joint is good or not, i.e., acceptable or not.

The disclosed inspection process allows automatization of the conventional manual inspection procedure which has heretofore been carried out by skilled workers, and hence is highly efficient and reliable in evaluating constant-velocity joints. For sufficient inspection, however, it is necessary to measure maximum and minimum torque values while keeping the inner member tilted at a number of different angles. Measuring maximum and minimum torque values at many different angles requires a long period of time before a constant-velocity joint is evaluated, and presents an obstacle to efforts to further improve the inspection efficiency.

If the number of different angles for torque measurement were reduced in order to increase the inspection efficiency, then no torque would be measured between the angles, and constant-velocity joints would not be evaluated accurately.

SUMMARY OF THE INVENTION

In view of the aforesaid drawbacks of the conventional constant-velocity joint evaluation process, it is an object of the present invention to provide a method which is capable of evaluating a constant-velocity joint efficiently and reliably within a short period of time.

The inventors have conducted various researches, and, as a result, found that when the torque applied an inner member of a constant-velocity joint is measured while the inner member and an outer member of the constant-velocity joint are rotating, the r ak value of a change in the torque of the inner member with respect to the outer member at a certain tilt angle is produced each time the inner member makes a substantially one revolution. The inner member is continuously tilted down to a maximum tilt angle while it is rotating, and, when the inner member is being tilted, the torque applied to the inner member and the tilt angle thereof are measured at each of suitable rotational angles of the inner member. Based on the measured data, it is possible to detect maximum and minimum values of the torque applied to the inner member at the maximum tilt angle and also to calculate maximum and minimum values of the torque at a certain tilt angle from the maximum and minimum values of the torque at the maximum tilt angle.

To achieve the above object, there is provided in accordance with the present invention a method of inspecting a constant-velocity joint having inner and outer members which are rotatably held concentrically with each other, comprising the steps of continuously tilting the inner member with respect to the outer member up to a maximum tilt angle while rotating the inner member about its own axis, measuring and recording data including tilt angles and torque values of the inner member at predetermined rotational angles thereof while the inner member is being tilted, detecting a maximum torque value of the inner member at the maximum tilt angle and a first angular position of the inner member at the maximum torque value, from the recorded data, detecting a minimum torque value of the inner member at the maximum tilt angle and a second angular position of the inner member at the minimum torque value, from the recorded data, successively detecting tilt angles and torque values of the inner member at respective angular positions which are successive revolutions prior to the first angular position at the maximum torque value, from the recorded data, and setting the torque values as maximum torque values at the corresponding tilt angles, successively detecting tilt angles and torque values of the inner member at respective angular positions which are successive revolutions prior to the second angular position at the minimum torque value, from the recorded data, and setting the torque values as minimum torque values at the corresponding tilt angles, calculating a pair of curves representing the maximum and minimum torque values, respectively, at the respective tilt angles of the inner member, from the set maximum and minimum torque values, and thereafter, calculating a maximum torque value and a minimum torque value at a given tilt angle of the inner member, from the curves, and comparing the calculated maximum and minimum torque values with predetermined reference values, thereby determining whether the constant-velocity joint is good or not.

With the above inspecting method, the inner member is continuously tilted up to the maximum tilt angle while the inner member is rotating. From the data including tilt angles and torques which are measured when the inner member is tilted, and also from the maximum and minimum torque values at the maximum tilt angle which are detected from the measured data, there is calculated a pair of curves indicative of the maximum and minimum torque values of the inner member at the respective tilt angles. Maximum and minimum torque values at a given tilt angle of the inner member are then calculated from the calculated curves, and then compared with the predetermined reference values, thereby determining whether the constant-velocity joint is good or not.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
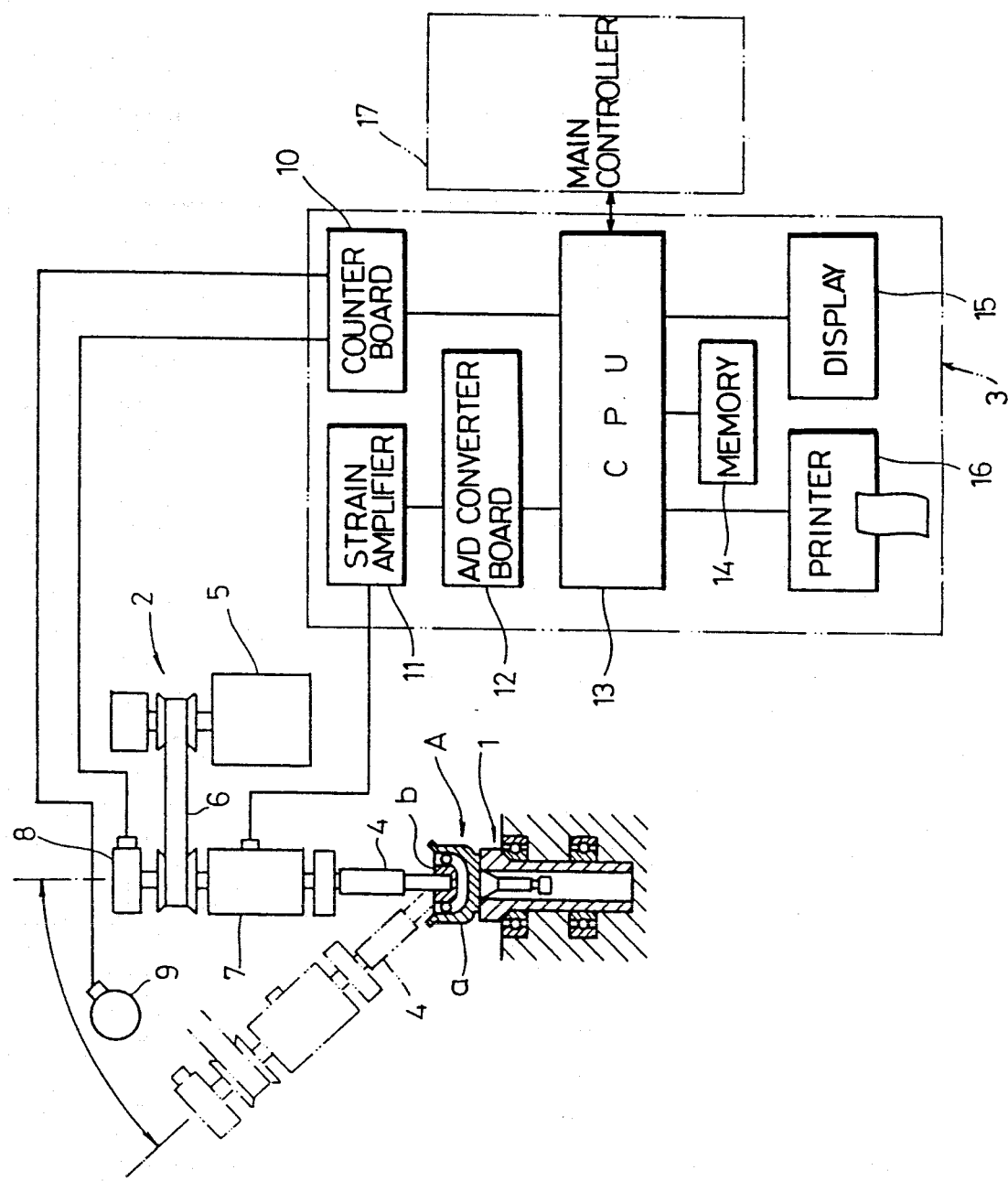
FIG. 1 is a block diagram of an apparatus for carrying out a method of inspecting a constant-velocity joint according to the present invention.

FIG. 1 shows an apparatus for carrying out a method of inspecting a constant-velocity joint according to the present invention.

As shown in FIG. 1, a constant-velocity joint A comprises an outer member a and an inner member b. The outer member a is vertically rotatably supported by a holder 1. The inner member b is rotatable, together with the outer member a, by a drive unit 2. The drive unit 2 is controlled by a measurement control unit 3 which measures torque data and processes the measured data to determine whether the constant-velocity joint A is good or not, i.e., acceptable or not.

The drive unit 2 has a drive shaft 4 which has a lower end concentrically inserted in the inner member b that is concentrically positioned in the outer member a rotatably held in the holder 1. The drive shaft 4 is rotated about its own axis by a drive motor 5 through a drive belt 6 and a torque meter 7. The inner and outer members b, a can thus be rotated together by the drive unit 2.

The torque applied to the inner member b by the drive shaft 4 is detected by the torque meter 7. The torque meter 7 produces a signal representing the torque applied to the inner member b. The rotational angle through which the inner member b has rotated is detected by a rotational angle detecting encoder 8 coupled to the drive shaft 4. The encoder 8 generates a pulse each time the drive shaft 4, i.e., the inner member b, rotates through a predetermined angle.

The drive shaft 4 with its lower end inserted in the inner member b is tilted, together with the drive motor 5 and other components of the drive unit 2, by a cylinder or the like (not shown), so that the inner member b is tilted with respect to the outer member a. The tilt angle, through which the inner member b is tilted at this time, is detected by a tilt angle detecting encoder 9. The encoder 9 generates a pulse each time the drive shaft 4, i.e., the inner member b, is tilted through a predetermined tilt angle.

The measurement control unit 3 comprises a counter board 10 for counting pulses generated by the encoders 8, 9, a strain amplifier 11 for amplifying an output signal from the torque meter 7, an A/D converter board 12 for converting the amplified signal from the strain amplifier 11 into a digital signal, and a CPU 13 for controlling the boards 10, 12 and the drive unit 2. The pulse counts from the counter board 10 and the digital torque signal from the A/D converter board 12 are stored in a memory 14 at every given interval of time under the control of the CPU 13.

Therefore, the rotational angle of the inner member b and the tilt angle thereof are measured by the counter board 10 as respective pulse counts representing the magnitudes of the rotational angle and the tilt angle. The torque applied to the inner member b is also measured as corresponding digital data. These measured data are stored at every given interval of time in the memory 14.

The measurement control unit 3 also has a CRT display 15 and a printer 16 for displaying and recording the measured data. The measurement control unit 3 is controlled by a main controller 17 through the CPU 13.

Figure 2:
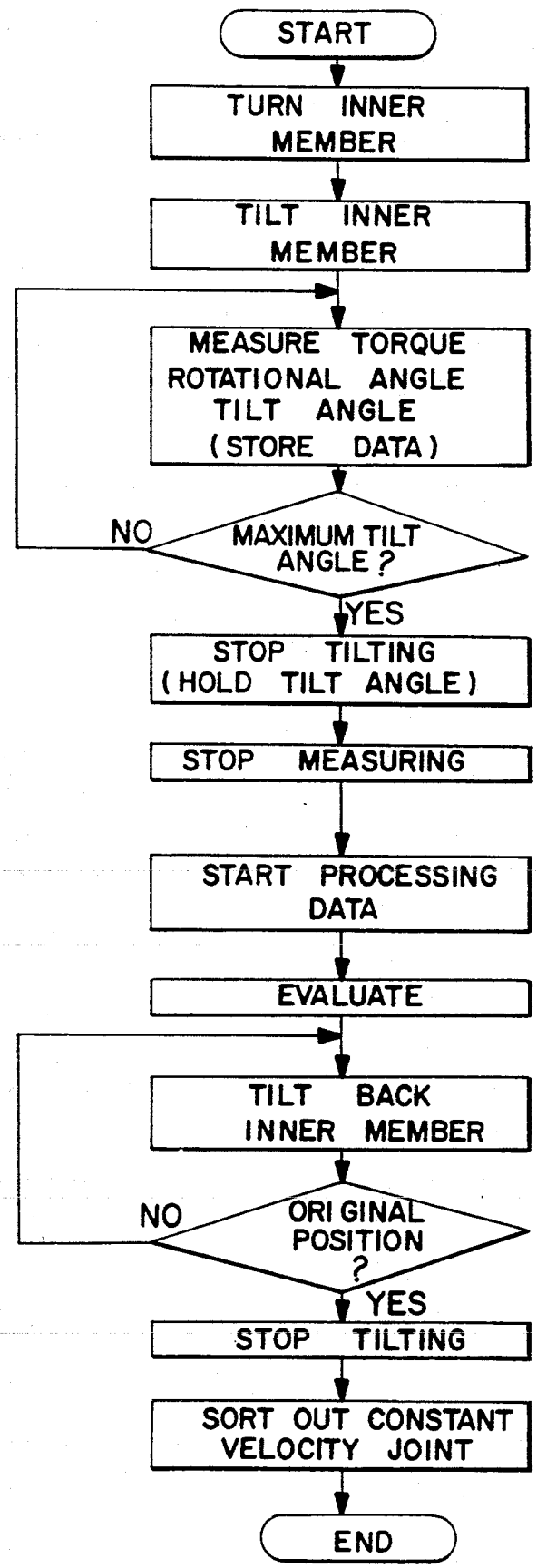
FIG. 2 is a flowchart of an operation sequence of the apparatus shown in FIG. 1.

An operation sequence of the apparatus shown in FIG. 1 will be described below with reference to FIG. 2.

The inner member b of the constant-velocity joint A, which is held concentrically with the outer member a thereof, is rotated together with the outer member a by the drive unit 2. Then, the inner member b is continuously tilted with respect to the outer member a. At the same time, the torque, rotational angle, and tilt angle of the inner member b are measured under the control of the CPU 13, and the measured data are stored at every interval of time in the memory 14.

The inner member b is continuously tilted until it reaches a predetermined maximum tilt angle under the control of the CPU 13. When the inner member -b has reached the maximum tilt angle, the inner member b is held at the maximum tilt angle for a given period of time while it is rotating. The above data are continuously measured until the given period of time elapses. After elapse of the given period of time, the inner member b is tilted back to its original position. At the same time that the data measurement is finished, the CPU 13 starts processing the measured data in order to determine whether the constant-velocity joint A is acceptable or not. When the inner member b has returned to the original position, the constant-velocity joint A is sorted out dependent on whether it is acceptable or not as determined by the processing operation of the CPU 13.

Figure 3:
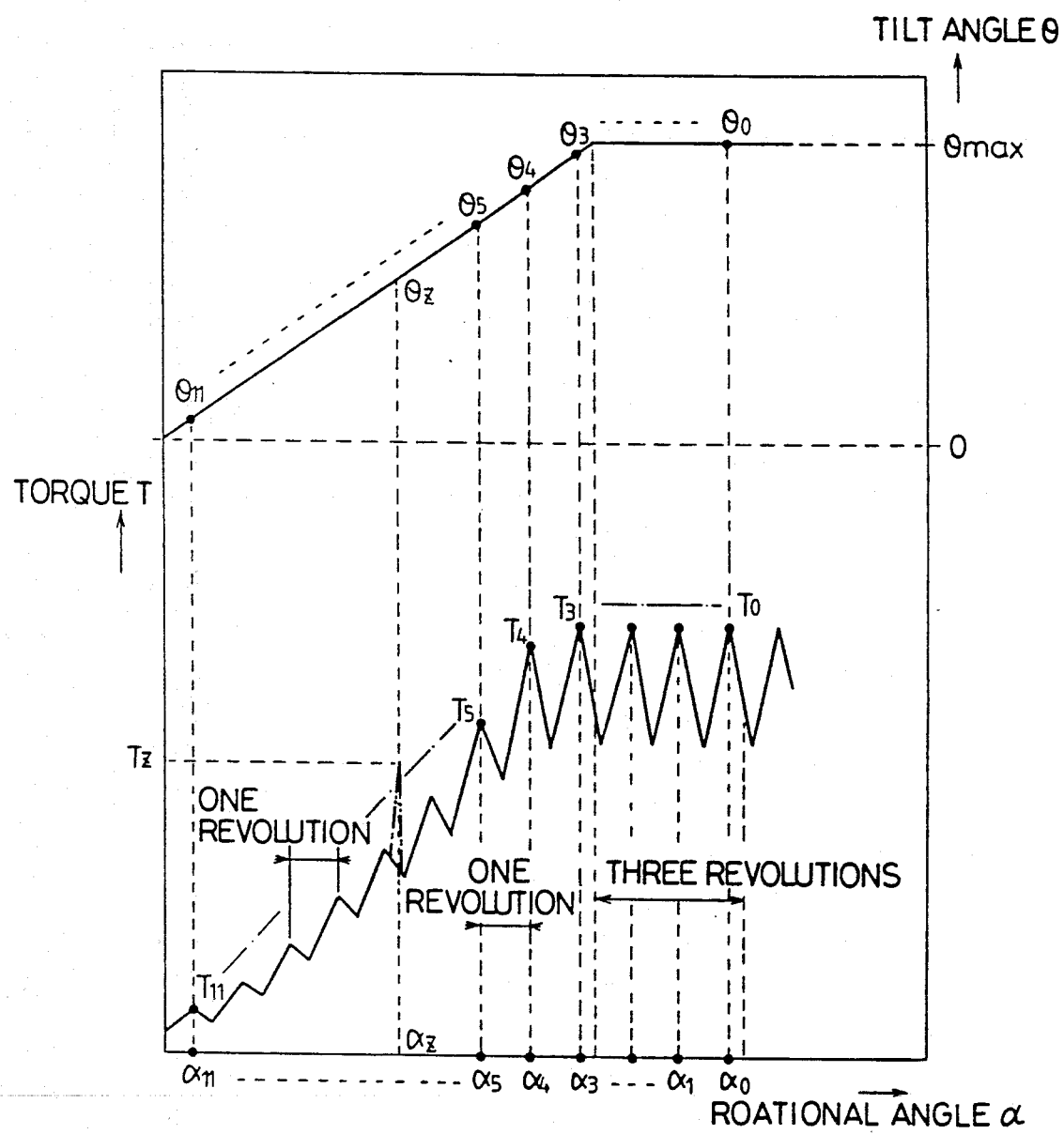
FIGS. 3 and 4 are diagrams illustrative of a processing sequence of the method according to the present invention.
Figure 4:
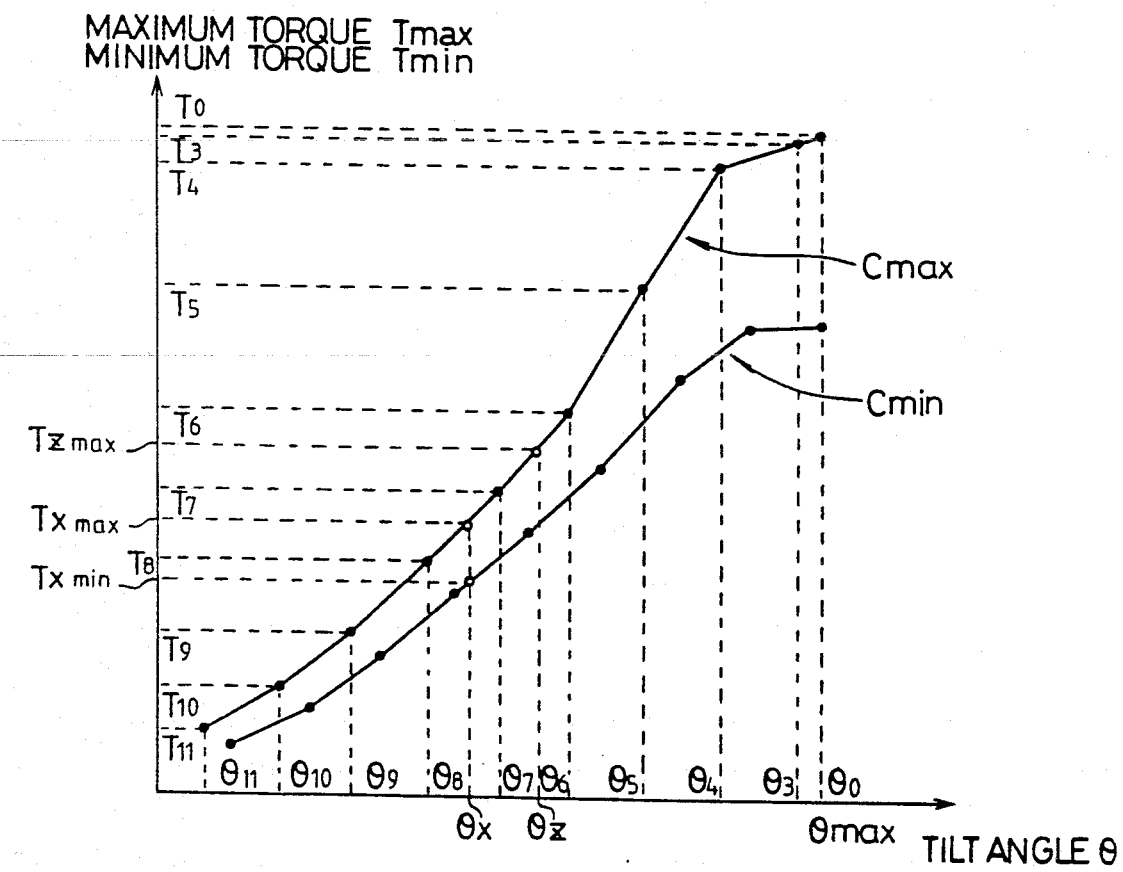

The processing sequence which is executed by the CPU 13 for constant-velocity joint evaluation will now be described below with reference to FIGS. 3 and 4. FIG. 3 shows, by way of example, how the torque T and the tilt angle $\theta$ of the inner member b vary with respect to the rotational angle $\alpha$ of the inner member b. FIG. 4 shows, by way of example, how a maximum torque value Tmax and a minimum torque value Tmin vary with respect to the tilt angle $\theta$.

As shown in FIG. 3, the tilt angle $\Theta$ of the inner member b increases substantially linearly with the rotational angle $\alpha$ up to the maximum tilt angle $\theta$max. The torque T periodically varies each time the inner member b makes one revolution. The torque T as it periodically varies increases with the tilt angle $\theta$ until the tilt angle $\theta$ reaches the maximum tilt angle $\theta$max, and, thereafter, the torque T varies with a substantially constant amplitude.

According to the processing sequence, curves (see FIG. 4) indicating the maximum value Tmax and the minimum value Tmin of the torque T as they vary with respect to the tilt angle $\theta$ of the inner member b are first calculated. Then, maximum and minimum values of the torque T are calculated. at certain tilt angles $\theta$ from the curves. These calculated maximum and minimum torque values are compared with predetermined reference values, thereby determining whether the constant-velocity joint A is good or not. If necessary, the curves and the measured data may also be compared to determine whether the constant-velocity joint A is good or not.

The curve of the maximum values Tmax of the torque T is calculated as follows: In FIG. 3, a rotational angle $\alpha_0$ where the torque T is maximum when the inner member b is held at the maximum tilt angle $\theta$max is detected from the measured data. Immediately after the inner member b has been tilted to the maximum tilt angle $\theta$max, the torque T may be unstable due to vibration of the inner member b when it is stopped in the maximum tilted position. In the illustrated embodiment, after the inner member b is tilted up to the maximum tilt angle $\theta$max, the inner member b is rotated through three successive revolutions, and the rotational angle $\alpha_0$ at which the torque T is maximum is detected while the inner member b is making the third revolution. A torque value $T_0$ and a tilt angle $\theta_0 (= \theta$max) at the rotational angle $\alpha_0$ are stored in the memory 14.

Then, torque values $T_1$ through $T_{11}$ and tilt angles $\theta_1$ through $\theta_{11}$ at respective rotational angles $\alpha_1$ through $\alpha_{11}$, which are obtained by successively decrementing the rotational angle $\alpha_0$ by the angle of one revolution of the inner member b, i.e., 360°, are stored in the memory 14. Since the torque T periodically varies each time the inner member b makes one revolution, the torque values $T_0$ through $T_{11}$ at the respective rotational angles $\alpha_0$ through $\alpha_{11}$ may be regarded as maximum torque values at the corresponding tilt angles $\theta_0$ through $\theta_{11}$. Therefore, the torque values $T_0$ through $T_{11}$ are set as the maximum torque values $T_0$ through $T_{11}$ at the respective tilt angles $\theta_0$ through $\theta_{11}$.

Points $(\theta_0, T_0)$ through $(\theta_{11}, T_{11})$ shown in FIG. 4 which are represented by the tilt angles $\theta_0$ through $\theta_{11}$ and the maximum torque values $T_0$ through $T_{11}$ are successively linearly interpolated, thereby calculating a curve Cmax which indicates how the maximum torque Tmax varies with respect to the tilt angle $\theta$. The maximum torque values $T_1$, $T_2$ are those obtained when the inner member b makes the second and first revolutions, respectively, at the maximum tilt angle $\theta$max. Since the maximum torque Tmax at the maximum tilt angle $\theta$max is given as the maximum torque value $T_0$ when the inner member b makes the third revolution, as described above, the maximum torque values $T_1$, $T_2$ and the corresponding tilt angles $\theta_1$, $\theta_2$ are not employed in the calculation of the curve Cmax.

The curve Cmin of the minimum values Tmin of the torque T as they vary with the tilt angle $\theta$ is calculated in the same manner as described above.

After the curves Cmax, Cmin have been calculated, maximum torque values Tmax and minimum torque values Tmin at certain predetermined tilt angles $\theta$ are calculated from the curves Cmax, Cmin, and then compared with predetermined reference values, thus determining whether the constant-velocity joint A is good or not.

More specifically, as shown in FIG. 4, it is assumed that one of the predetermined tilt angles $\theta$ at which the maximum torque value Tmax and the minimum torque value Tmin are to be compared with the reference values is $\theta x$ ($\theta_8 < \theta x < \theta_7$). The maximum torque value Txmax at the tilt angle $\theta x$ is then calculated from the expression of a straight line which interconnects two points $(\theta_7, T_7)$, $(\theta_8, T_8)$ on the curve Cmax. Similarly, the minimum torque value Txmin at the tilt angle $\theta x$ is also calculated from the expression of a straight line which interconnects two points on the curve Cmin which sandwich the tilt angle $\theta x$ therebetween.

The maximum torque value Txmax, the minimum torque value Txmin, an intermediate value between the maximum and minimum torque values Txmax, Txmin, the difference between the maximum and minimum torque values Txmax, Txmin, and the rate of increase of the torque between the tilt angle $\theta x$ and a preceding angle $\theta x$-1 on each of the curves Cmax, Cmin, are compared with reference values. If the result of comparison falls within an allowable range, then the constant-velocity joint A is judged as being good. Such a judging process is carried out with respect to several predetermined tilt angles $\theta$. If even one of the results of comparison in the judging processes is found to be out of the allowable range, then the constant-velocity joint A is determined to be not good.

The curves Cmax, Cmin which are calculated as described above are also compared with the measured data, and the result of comparison is used to determined whether the constant-velocity joint A is good or not.

More specifically, while the inner member b is rotating, the inner member b may be caught by the outer member a for some reason, resulting in a positive torque spike having a peak value Tz at a rotational angle $\alpha z$ as indicated by the imaginary line in FIG. 3. When such a positive torque spike is produced, a maximum torque value Tzmax at a tilt angle $\theta z$ at this time is calculated from the curve Cmax shown in FIG. 4. The maximum torque value Tzmax and the spike peak value Tz are compared. If the difference between these values exceeds an allowable range then the constant-velocity joint A is judged as being not good.

With the present invention, as described above, the inner member b is continuously tilted and at the same time the tilt angle $\theta$, the torque T, and the rotational angle $\alpha$ of the inner member b are measured, and thereafter the measured data are processed to determine whether the constant-velocity joint A is good or not. The time required for mechanical measurement is shortened, and the process of determining whether the constant-velocity joint A is good or not can be carried out in a short period of time. Since the measured data are compared with the curve Cmax of maximum torque values Tmax and the curve Cmin of minimum torque values Tmin, which are obtained from the measured data, the process of determining whether the constant-velocity joint A is good or not can reliably be effected.

Although a certain preferred embodiment has been shown and described, it should be understood that many changes and modifications may be made therein without departing from the scope of the appended claims.

What is claimed is:

1. A method of inspecting a constant-velocity joint having inner and outer members which are rotatably held concentrically with each other, comprising the steps of:

continuously tilting the inner member with respect to the outer member up to a maximum tilt angle while rotating the inner member about its own axis:

measuring and recording data including tilt angles and torque values of the inner member at predetermined rotational angles thereof while the inner member is being tilted;

detecting a maximum torque value of the inner member at said maximum tilt angle and a first angular position of the inner member at said maximum torque value, from said recorded data;

detecting a minimum torque value of the inner member at said maximum tilt angle and a second angular position of the inner member at said minimum torque value, from said recorded data;

successively detecting tilt angles and torque values of the inner member at respective angular positions which are successive revolutions prior to said first angular position at said maximum torque value, from said recorded data, and setting said torque values as maximum torque values at the corresponding tilt angles;

successively detecting tilt angles and torque values of the inner member at respective angular positions which are successive revolutions prior to said second angular position at said minimum torque value, from said recorded data, and setting said torque values as minimum torque values at the corresponding tilt angles;

calculating a pair of curves representing the maximum and minimum torque values, respectively, at the respective tilt angles of the inner member, from the set maximum and minimum torque values; and thereafter, calculating a maximum torque value and a minimum torque value at a given tilt angle of the inner member, from said curves, and comparing said calculated maximum and minimum torque values with predetermined reference values, thereby determining whether the constant-velocity joint is good or not.

2. A method according to claim 1, further comprising the step of:

comparing the maximum and minimum torque values on said curves at the respective tilt angles and said maximum tilt angle of the inner member with said recorded data, thereby determining whether the constant-velocity joint is good or not.

3. A method according to claim 1, further comprising the step of:

comparing said calculated maximum and minimum torque values with maximum and minimum torque values which are to be required by the constant-velocity joint at said given tilt angle, thereby determining whether the constant-velocity joint is good or not.

4. A method according to claim 1, further comprising the step of:

comparing an intermediate value between said calculated maximum and minimum torque values with an intermediate value between maximum and minimum torque values which are to be required by the constant-velocity joint at said given tilt angle, thereby determining whether the constant-velocity joint is good or not.

5. A method according to claim 1, further comprising the step of:

comparing the difference between said calculated maximum and minimum torque values with the difference between maximum and minimum torque values which are to be required by the constant-velocity joint at said given tilt angle, thereby determining whether the constant-velocity joint is good or not.

6. A method according to claim 1, wherein said step of calculating a maximum torque value and a minimum torque value comprises calculating a first maximum torque and a first minimum torque value on said curves at a first tilt angle; and calculating a second maximum torque value and a second minimum torque value on said curves at a second tilt angle which is smaller than said first tilt angle; said method further comprising the steps of;

calculating a rate of increase of the maximum torque between said first and second maximum torque values and a rate of increase of the minimum torque between said first and second minimum torque values; and comparing said calculated rates with rates of increase of maximum and minimum torques which are to be required by the constant-velocity joint between said first and second tilt angels, thereby determining whether the constant-velocity joint is good or not.

7. A method of inspecting a constant-velocity joint having inner and outer members which are rotatably held concentric with each other comprising the steps of:

(a) continuously tilting the inner member with respect to the outer member up to a maximum tilt angle while rotating the inner member about its own axis; and (b) measuring torque applied to the inner member by rotation; and (c) measuring the tilt angle of the inner member during predetermined rotational angles of the inner member;

(d) using the measured torque and tilt angles from said steps (b) and (c) to determine maximum and minimum values of torque applied to the inner member at predetermined tilt angles and establish whether the constant-velocity joint is good therefrom.

8. The method of claim 7, wherein both the inner and outer member are rotated.

9. The method of claim 8, further including the step of;

(e) measuring the torque applied to the inner member to determined the peak value of a change in torque of the inner member with respect to the outer member at a certain tilt angle each time the inner member makes one revolution.

10. The method of claim 9, further including the step of;

(f) detecting maximum and minimum values of the torque at a certain tilt angle from the maximum and minimum values of torque at the maximum tilt angle.

* * * * *